Feb. 28, 1956 　　　A. J. FERRO 　　　2,736,419
PUSHER BAR RETRACTOR FOR BREAD COOLER
Filed July 15, 1954 　　　3 Sheets-Sheet 1

INVENTOR.
Anthony J. Ferro
BY
Otto Moeller
Attorney

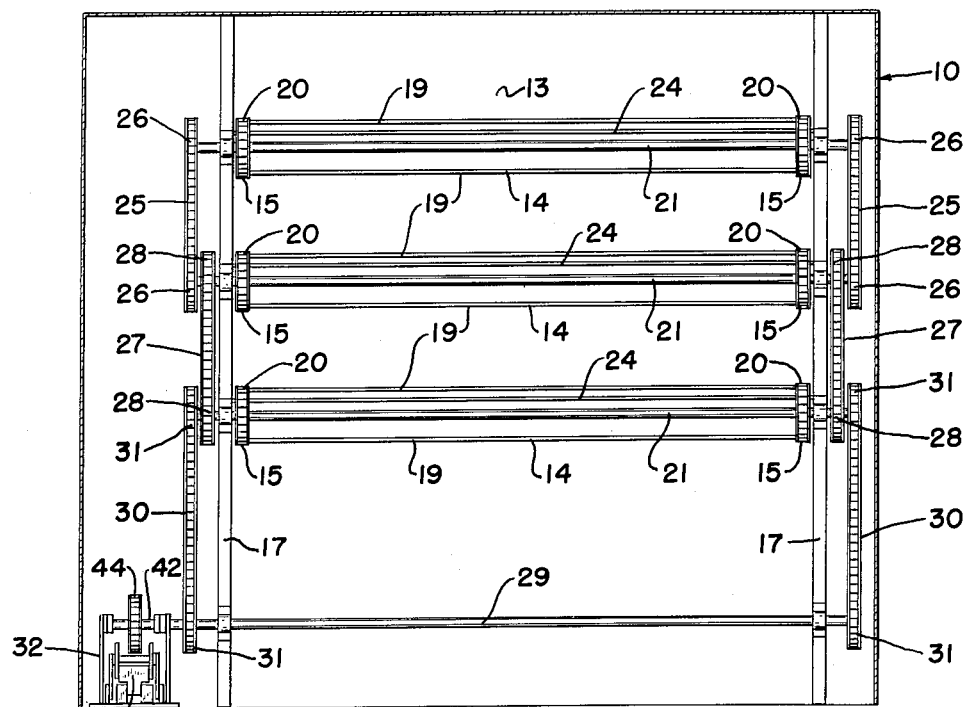
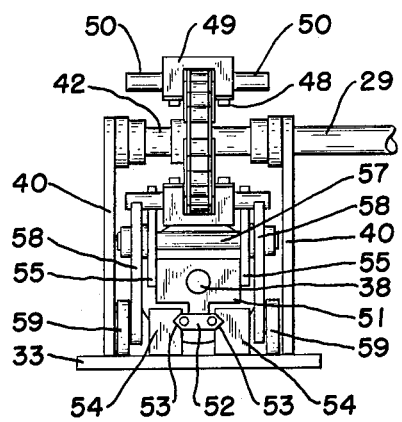
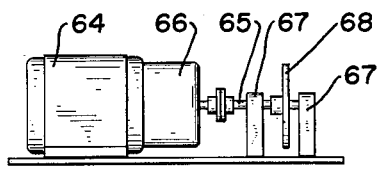
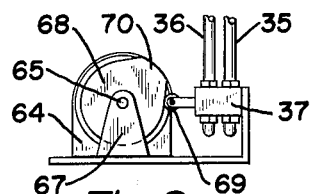
Fig. 2
Fig. 4
Fig. 7
Fig. 8
INVENTOR.
Anthony J. Ferro
BY
Otto Moeller
Attorney Feb. 28, 1956      A. J. FERRO      2,736,419
PUSHER BAR RETRACTOR FOR BREAD COOLER
Filed July 15, 1954      3 Sheets-Sheet 3
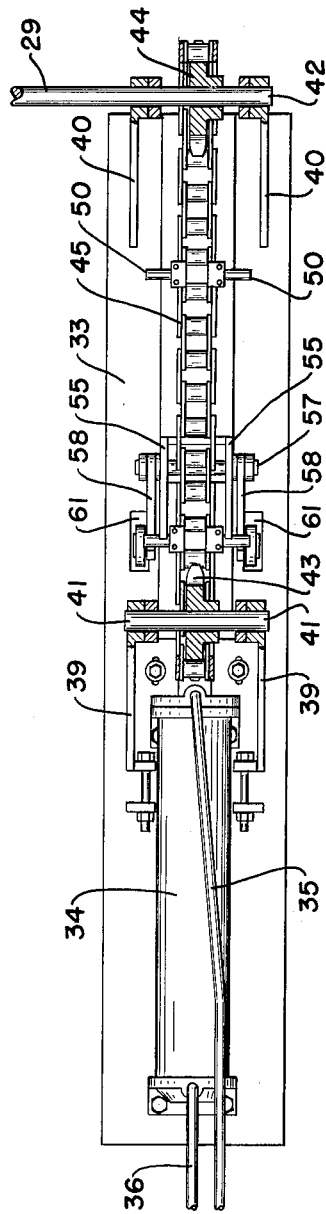
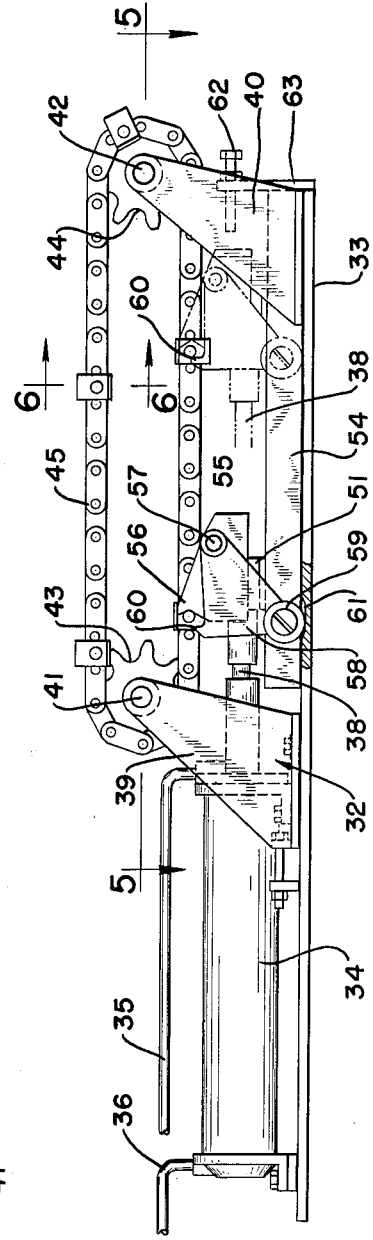
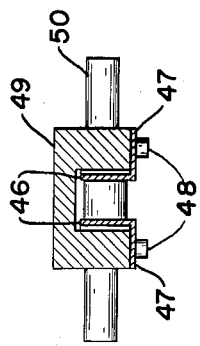
INVENTOR.
Anthony J. Ferro
BY
Otto Moeller
Attorney

United States Patent Office 2,736,419
Patented Feb. 28, 1956

2,736,419

PUSHER BAR RETRACTOR FOR BREAD COOLER

Anthony J. Ferro, York, Pa., assignor to Read Standard Corporation, New York, N. Y., a corporation of Delaware Application July 15, 1954, Serial No. 443,641

6 Claims. (Cl. 198—75)

This invention relates generally to article handling and conveying apparatus and particularly pertains to a pusher bar type conveyor for intermittently slidably pushing successive rows of bread along a stationary bread supporting grid or deck of a bread cooler.

In such bread coolers the bread supporting grids and the conveying means for pushing the bread therealong are preferably arranged in a plurality of superimposed vertically spaced tiers extending between a loading zone and an unloading zone, as for example in Duval Patent No. 2,638,685 of May 19, 1953, providing a plurality of paths for the bread to be cooled, thereby increasing the bread handling capacity of the cooler.

The bread supporting grids are preferably formed of a plurality of longitudinally extending rods in end to end relation and laterally spaced, the diameter of the rods and the spacing therebetween being such as to provide adequate air crculation and to minimize condensation to an extent that loaves cooled thereon are subjected to no substantial marking, disfiguration and structural weakening. The pusher bars for pushing the rows of bread loaves along the grid are necessarily of substantial cross sectional area in order to provide the rigidity and strength necessary to advance the rows of bread loaves.

The moisture content of much of the bread sold today is so high that, in many instances, the loaves sweat considerably as they are cooled after baking, such sweating being the result of exudation of moisture from the interior of the loaves. If the pusher bars, which necessarily have a considerable area and mass, remain in contact with the soft hot loaves of bread throughout their passage through the cooler, seventy-five minutes in a typical example, the exuded moisture cannot evaporate freely since the cooling air will not reach the areas of the loaves in contact with the pusher bars. Consequently the moisture is absorbed by the crusts of the loaves with the result that the loaves are marked, disfigured and structurally weakened.

In addition, the pusher bars are, initially at least, cooler than the loaves, and thus tend to condense considerable moisture which has been evaporated thereadjacent until such time as they are heated approximately to the surface temperature of the loaves. Continuous contact of the pusher bars with the loaves during this time results in excessive condensation and consequent marking and disfiguring of the loaves.

A primary object of the present invention is to provide a conveying system for a bread cooler that overcomes the foregoing objectionable features.

More particularly, an important object is to provide an improved pusher conveyor system for a bread cooler wherein after each periodic pushing stroke of the pusher bars, they are mechanically backed away from the rows of bread loaves, and remain in retracted or backed away position for an interval of time during which another row of loaves are loaded onto the loaf supporting grid of the bread cooler.

The foregoing objects and advantages of the present invention, together with various other objects and advantages thereof will become apparent from the following description and the accompanying drawings illustrating a preferred embodiment of the invention. In the drawings:

Figure 2 is a sectional view through the discharge end of the cooler with the invention shown therein in end elevation;

Figure 3 is an enlarged side elevation of the actuating means for the superimposed conveyors of Figure 1;

Figure 4 is an end elevation of the actuating means of Figure 3;

Figure 5 is a sectional view taken on the line 5—5 of Figure 3;

Figure 6 is a sectional view taken on the line 6—6 of Figure 3;

Figure 7 is a view in side elevation of the control system for the actuating means of Figure 3; and Figure 8 is an end view of the control means of Figure 7.

Figure 1:
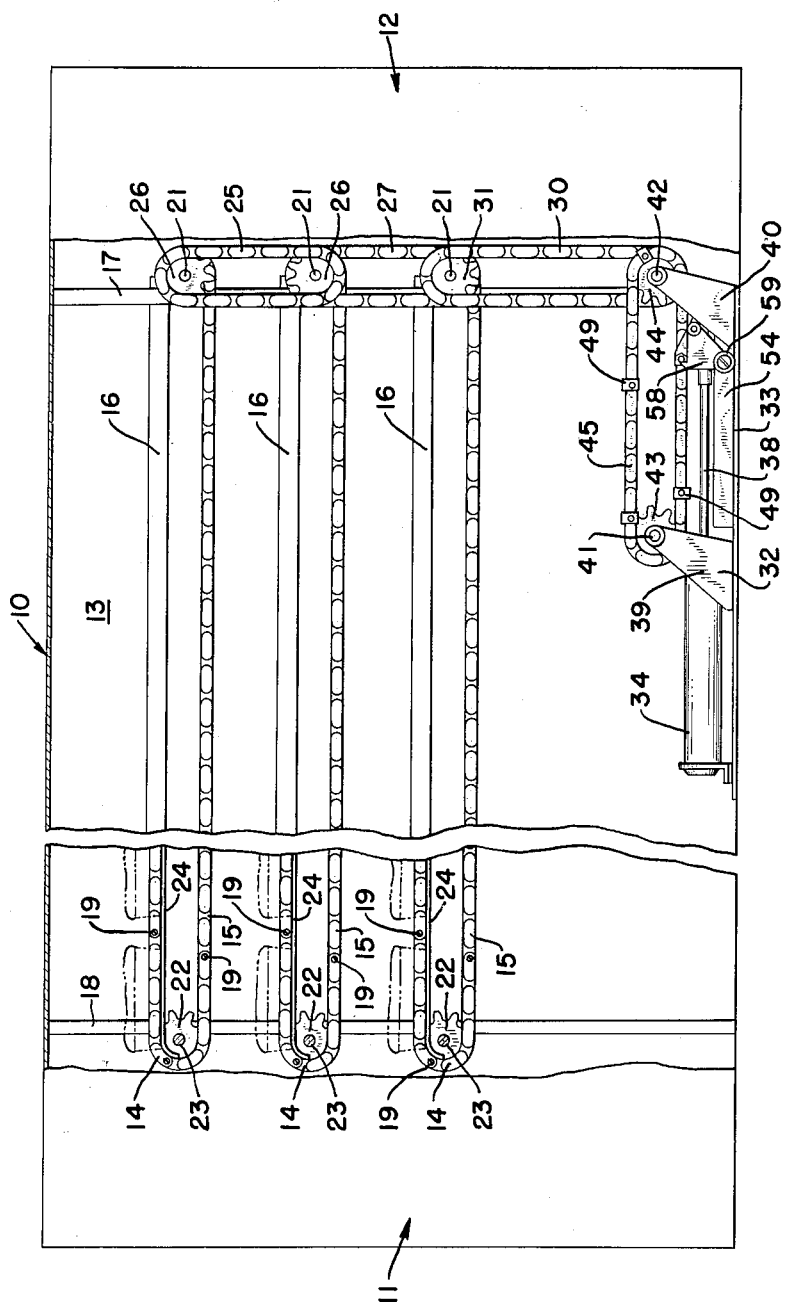
Figure 1 is a side elevation of a bread cooler with parts broken away to show the invention applied thereto.

In the drawings, referring particularly to Figures 1 and 2, a bread cooler is indicated generally by the numeral 10 which includes an inlet end 11, an outlet end 12, and an elongated cooling chamber 13 therebetween.

In the cooling chamber 13 are disposed a plurality of superimposed, vertically spaced conveyors 14, which extend generally horizontally from the inlet end 11 of the cooler to the outlet end 12 thereof. In the present instance three such conveyors are shown, though the number may be varied, and these conveyors are of a width to accommodate a plurality of loaves of bread disposed in rows extending transversely of the cooling chamber 13.

The inlet end 11 of the cooler 10 may house transferring means for automatically delivering successive rows of bread to each of the conveyors 14 simultaneously. The outlet end 12 of the cooler 10 may house mechanism for receiving successive rows of bread from each of the conveyors 14 simultaneously and for transferring the rows to an outlet conveyor, so that the latter removes the bread in single file. Such loading and unloading means constitutes no part of the present invention and is therefore not illustrated or described. One form of loading and unloading mechanism is disclosed in Patent No. 2,638,685 to M. H. Duval, granted May 19, 1953.

Each of the conveyors 14 includes a pair of laterally spaced, longitudinally extending endless chains 15, the upper runs of which are supported by angles 16 serving as guides. The angles 16 extend along opposite sides of the cooling chamber 13 and are supported by a pair of upright frame members 17 adjacent the outlet end 12 of the cooler 10 and a pair of frame members 18 adjacent the inlet end 11 thereof. The pairs of chains 15 of the respective conveyors 14 are connected by transversely extending pusher or sweep bars 19, the sweep bars being secured at their ends to the chains and being spaced apart distances sufficient to receive therebetween the longest loaves of bread to be handled by the cooler, as best shown in Figure 1.

The respective chains 15 of the superimposed conveyors 14 are trained at one end of the cooling chamber 13 about sprockets 20 carried by shafts 21 rotatably mounted in the frame members 17, and are trained at the other end of the cooling chamber 13 about sprockets 22 carried by shafts 23 rotatably mounted in the frame members 18. For supporting the loaves of bread, each of the conveyors 14 is provided with a deck 24 of grid-like form disposed subjacent the upper runs of the chains 15 and supported in any suitable manner, as by the angles 16. When the chains 15 are driven, the pusher bars 19, which are carried by the chains 15, push the rows of bread loaves along the grid-like deck 24.

At the driving end of the conveyors 14, in this instance adjacent the outlet end 12 of the cooler, the shafts 21 project through the upright frame members 17, as shown in Figure 2. Chains 25 trained around sprockets 26 fixed on the projecting end portions of the upper two of the three shafts 21 at the outlet end of the cooler provide a drive connection between the upper two of the three conveyors 14. Chains 27 trained around sprockets 28 fixed on the projecting end portions of the lower two of the three shafts 21 at the outlet end of the cooler provide a drive connection between the lower two of the three conveyors 14.

A drive shaft 29, in vertical parallel alinement with and below the shafts 21 at the outlet end of the cooler, operated in a manner to be described, is rotatably mounted in and projects through the frame members 17. Chains 30 trained around sprockets 31 fixed on the projecting end portions of the shaft 29 and the lowermost of the shafts 21 at the outlet end of the cooler provide a drive connection between the shaft 29 and the lowermost of the conveyors 14. Through the medium of the sprocket and chain connections described above, all of the conveyors 14 are driven in unison.

The means for operating the shaft 29 and hence the conveyors 14 is indicated as a whole by the numeral 32 and is mounted on a base plate 33 in the bottom of the cooler and adjacent one side thereof near the outlet end of the cooler. The operating means 32 includes a hydraulic cylinder and piston unit 34 and as will be apparent from the description hereinafter, each time the piston in the cylinder of the hydraulic unit 34 is moved from one end of its cylinder to the other and back again, the superimposed conveyors 14 are advanced one step, whereby the rows of bread loaves on the grid-like decks 24 are pushed forwardly one step by the pusher bars 19. The hydraulic unit 34 is adapted to be actuated by fluid in hydraulic lines 35 and 36, Figures 3 and 5, connected, respectively, to opposite ends of the cylinder of the hydraulic unit 34, flow of fluid through the lines 35 and 36 being controlled by a selector valve 37, as hereinafter described.

The hydraulic unit 34 is operated intermittently, as hereinafter explained, thereby operating the conveyors 14 intermittently to provide an interval of time between each advance of the rows of bread loaves by the pusher bars 19 during which another row of bread loaves is loaded on each of the conveyors 14. As previously explained, if during these intermissions, which are of considerably longer duration than the time required to advance the bread loaves, the pusher bar is permitted to remain in contact with the bread loaves, condensation of moisture occurs in the area of contact with the result that the loaves are marked, disfigured and structurally weakened. An important feature of the invention is the provision of means for retracting the pusher bars 19 during these intermissions so that the pusher bars are in contact with the loaves for a minimum period of time. The means for accomplishing this will now be described.

Mounted on the base plate 33 adjacent the forward end of the cylinder of hydraulic unit 34 and straddling the piston rod 38 of the hydraulic unit 34 are a pair of upright standards 39. A similar pair of upright standards 40 are mounted on base plate 33 spaced forward of the upright standards 39. Rotatably mounted in the standards 39 and 40 are respective transversely extending shafts 41 and 42, the shaft 42 being in alinement with and connected to or forming an integral extension of the shaft 29. A sprocket 43 is fixed on shaft 41 between standards 39 and a sprocket 44 is fixed on shaft 42 between standards 40. A chain 45 is trained around the sprockets 43 and 44.

The opposite side plates 46 of certain of the links of the chain 45, in the present instance every eighth one, are formed with laterally outwardly projection flanges or ears 47 to which are secured in any suitable manner, as by cap screws 48, the transversely extending U-shaped blocks 49. Each of the blocks 49 is formed with a pair of laterally and oppositely projecting lugs 50 arranged to be engaged by means, to be described, carried by the piston rod 38 for intermittently moving the chain 45 in a clockwise direction, as viewed in Figure 3, whereby through the drive connections previously described the conveyors 14 are intermittently moved in unison in a step-by-step manner.

On the piston rod 38 is mounted a cross head 51, T-shaped in transverse cross section, the lower end of which is provided with transversely extending guide means 52. As shown in Figure 4, the ends of the guide means 52 are slidably mounted in longitudinally extending guideways 53 formed in the adjacent sides of the longitudinally extending, laterally spaced guide support members 54.

A pair of plate-like longitudinally extending brackets 55 are secured in any suitable manner, as by welding, to the opposite sides of the cross head 51. The upper edge of each of the brackets 55 has formed therewith a pawl or latch member 56 which is so disposed with respect to the blocks 49 on the lower run of the chain 45 that upon the retracting stroke of the cross head 51, these pawl or latch members 56 engage respective lugs 50 of one of the blocks 49 to move the chain 45 in a clockwise direction. As previously explained, this moves the conveyors 14, whereby the pusher bars 19 advance the rows of bread loaves one step. On the extending stroke of the cross head 51, when the pawls 56 reach the lugs 50 of the next one of the blocks 49 they will, by reason of the slope of that portion contacting the lugs 50, cam the lower run of chain 45 upwardly so that the pawls pass under the lugs 50. The chain 45 then drops back down so that the pawls 56 are again in position to engage the lugs 50 to move the chain 45 on the retracting stroke of the cross head 51. This position of the various elements is shown in phantom in Figure 3.

The rows of bread loaves having been advanced one step by the pusher bars 19, means is provided for backing the pusher bars 19 away from the bread loaves, before the pusher bars are again operated to advance the bread loaves another step. The means for accomplishing this will now be described.

A transversely extending shaft 57 is supported by and projects loosely through the brackets 55 beneath the lower run of chain 45 and at the opposite end portion of the brackets 55 from the pawls 56. Loosely mounted on the projecting ends of the shaft 57 are a pair of latch plates 58 extending toward and slightly beyond the pawl end portions of the brackets 55. The free ends of the so pivotally mounted latch plates 58 are supported on the base plate 33 by means of rollers 59 carried by the lower free end portions of the latch plates 58. The upper free ends of the pivoted latch plates 58 are provided with latch members 60 which, are at an elevation to engage the lugs 50 on the side thereof opposite engagement thereof by the pawls 56, as best shown in phantom in Figure 3. The top surface of the base plate 33 is provided with a pair of indentations 61, located so that when the cross head 51 is in its retracted position, the rollers 59 drop into the indentations 61 whereby the latch plates 58 pivot downwardly carrying the latch members 60 below the level of the lugs 50 as shown at the left in full lines in Figure 3.

In operation, assuming that the piston rod 38 has moved to its fully retracted position as shown in full lines in Figure 3, during which movement engagement of the pawls 56 with the lugs 50 has effected advancement of the pusher rods 19 one step, as previously described; now as the piston rod 38 moves toward its extended position, the latch members 60 will pass beneath the lugs 50. When the rollers 59 move up out of the indentations 61, the latch members 60 move up in position to engage the lugs 50 of the next block 49, as shown in phantom in Figure 3, and as the piston rod 38 continues to the end of its extending stroke, engagement of latch members 60 with lugs 50 effects movement of the chain 45 in a counterclockwise direction, and thereby retracts the pusher bars 19 through the drive connections previously described. The distance that the pusher bars 19 retract is consequently proportional to the distance the piston rod 38 travels to the end of its stroke after the latch members 60 engage lugs 50. This overtravel of the piston rod 38 after the latch members 60 engage the lugs 50 may be adjusted by means of an adjustable stop member 62 threaded in a standard 63 mounted on the base plate 33, the stop member 62 being in position to be engaged by the crosshead 51. Thus by threading the stop member 62 in or out, the stroke of the piston rod 38 is shortened or lengthened, and the extent of retraction of the pusher bars 19 is accordingly shortened or lengthened.

From the preceding description, it is apparent that each time the piston rod 38 moves from its extended position, as determined by the stop member 62, to its retracted position, as shown in full lines in Figure 3, and back again, the pusher bars 19 are advanced one step and there retracted a short distance.

The control means for controlling the operation of the pusher bars 19 includes a motor 64 which drives a shaft 65 through a speed reducing unit 66. The shaft 65 is mounted in bearings 67 and carries a cam disc 68. The selector valve 37 is positioned adjacent the cam disc 68 and is provided with a roller 69 which engages the periphery of cam disc 68. The cam disc 68 is provided with a cam shoulder 70 and each time the roller 69 of the selector valve 37 rides along the cam shoulder 70, the selector valve is actuated to actuate the hydraulic unit 34 by admission of fluid under pressure to the cylinder thereof through the line 35. When the roller 69 rides off the cam shoulder 70, the selector valve 37 reverses the flow of fluid under pressure, admitting fluid to the other end of the cylinder through line 36.

It will be seen that the cam shoulder 70 constitutes only a comparatively smal portion of the periphery of the cam disc 68, just sufficient to permit movement of the piston rod 38 from its extended to its retracted position. Thus for the greater portion of each revolution of the cam disc 68, the piston rod 38 is maintained in its fully extended position, during which period another row of loaves of bread is delivered to each of the conveyors 14.

I claim:

1. In a conveying system, supporting means for articles to be conveyed, a plurality of pusher bars movable along said supporting means for advancing successive articles therealong, actuating means for moving said pusher bars, control means for intermittently operating said pusher bar actuating means for pushing said articles along said supporting means in step-by-step movement, and said actuating means including means for retracting said pusher bars from engagement with said articles after each pushing stroke of said pusher bars, said last named means comprising an endless chain and a reciprocating actuator, means carried by said reciprocating actuator engaging said chain throughout movement of said actuator in one direction only for advancing said pusher bars one step, and means carried by said reciprocating actuator engaging said chain during a portion only of movement of said actuator in the opposite direction for retracting said pusher bars.

2. In a conveying system, supporting means for articles to be conveyed, a plurality of pusher bars movable along said supporting means for advancing successive articles therealong, actuating means for moving said pusher bars, control means for intermittently operating said pusher bar actuating means for pushing said articles along said supporting means in step-by-step movement, and said actuating means including means for retracting said pusher bars from engagement with said articles after each pushing stroke of said pusher bars, said last named means comprising an endless chain having a plurality of lugs spaced therealong at regular intervals, and includes also a reciprocating actuator, a first latch means carried by said reciprocating actuator engageable with successive lugs throughout movement of said actuator in one direction only for advancing said pusher bars one step, and a second latch means carried by said reciprocating actuator engageable with successive lugs during a portion only of movement of said actuator in the opposite direction for retracting said pusher bars.

3. In a conveying system, supporting means for articles to be conveyed, a plurality of pusher bars movable along said supporting means for serially advancing articles therealong, actuating means for said pusher bars including an endless chain and a reciprocating actuator, control means for intermittently operating said actuator once in each direction, means carried by said actuator engaging said chain throughout operation of said actuator in one direction for moving said chain in one direction and engaging said chain through only a portion of its operation in the opposite direction for partially retracting said chain, and means operatively connecting said chain with said pusher bars for advancing them during movement of said chain in said one direction and for retracting them during retracting movement of said chain.

4. An apparatus as defined in claim 3 wherein the means carried by the actuator includes a first latch means engageable with said chain upon movement of said actuator in one direction and a second latch means engageable with said chain upon movement of said actuator in the opposite direction.

5. An apparatus as defined in claim 4 wherein the endless chain is provided with a plurality of lugs spaced therealong at regular intervals, said lugs being engageable by said latch means for moving said endless chain.

6. In an article conveying apparatus for a bakery system, the combination of a frame, a plurality of superimposed, vertically spaced, generally horizontal conveyors carried by said frame, each of said conveyors having article supporting means, an endless chain at each side of each of said supporting means, and a plurality of pusher bars extending between the chains of each conveyor at regularly spaced intervals and movable over said supporting means for pushing articles therealong, actuating means for operating said conveyors in unison, control means intermittently operating said actuating means whereby to push articles along said article supporting means by said pusher bars in step-by-step movement, said actuating means including an endless chain and a reciprocating actuator, means carried by said reciprocating actuator engaging said last named endless chain throughout movement of said actuator in one direction only for advancing said pusher bars one step, and means carried by said reciprocating actuator engaging said last named endless chain during a portion only of movement of said actuator in the opposite direction for retracting said pusher bars.

References Cited in the file of this patent

UNITED STATES PATENTS 1,729,237    Albertoli _____ Sept. 24, 1929